April 2, 1957   S. STINER ET AL   2,787,402
LIQUID PROPORTIONING AND DISPENSING APPARATUS
Filed April 16, 1952   9 Sheets-Sheet 1

STEWART STINER
CHARLES F STEPHENSON
ALLEYNE C. HOWELL JR.
*INVENTORS:*

BY
Richardson, David and Nordon

ATTORNEYS

April 2, 1957 S. STINER ET AL 2,787,402
LIQUID PROPORTIONING AND DISPENSING APPARATUS
Filed April 16, 1952 9 Sheets-Sheet 3

STEWART STINER
CHARLES F. STEPHENSON
ALLEYNE C. HOWELL JR.
*INVENTORS:*

BY
*Richardson, David and Nordon*

ATTORNEYS

April 2, 1957     S. STINER ET AL     2,787,402
LIQUID PROPORTIONING AND DISPENSING APPARATUS
Filed April 16, 1952     9 Sheets-Sheet 4

STEWART STINER
CHARLES F. STEPHENSON
ALLEYNE C. HOWELL JR.
*INVENTORS:*

BY
*Richardson, David and Nordon*

ATTORNEYS

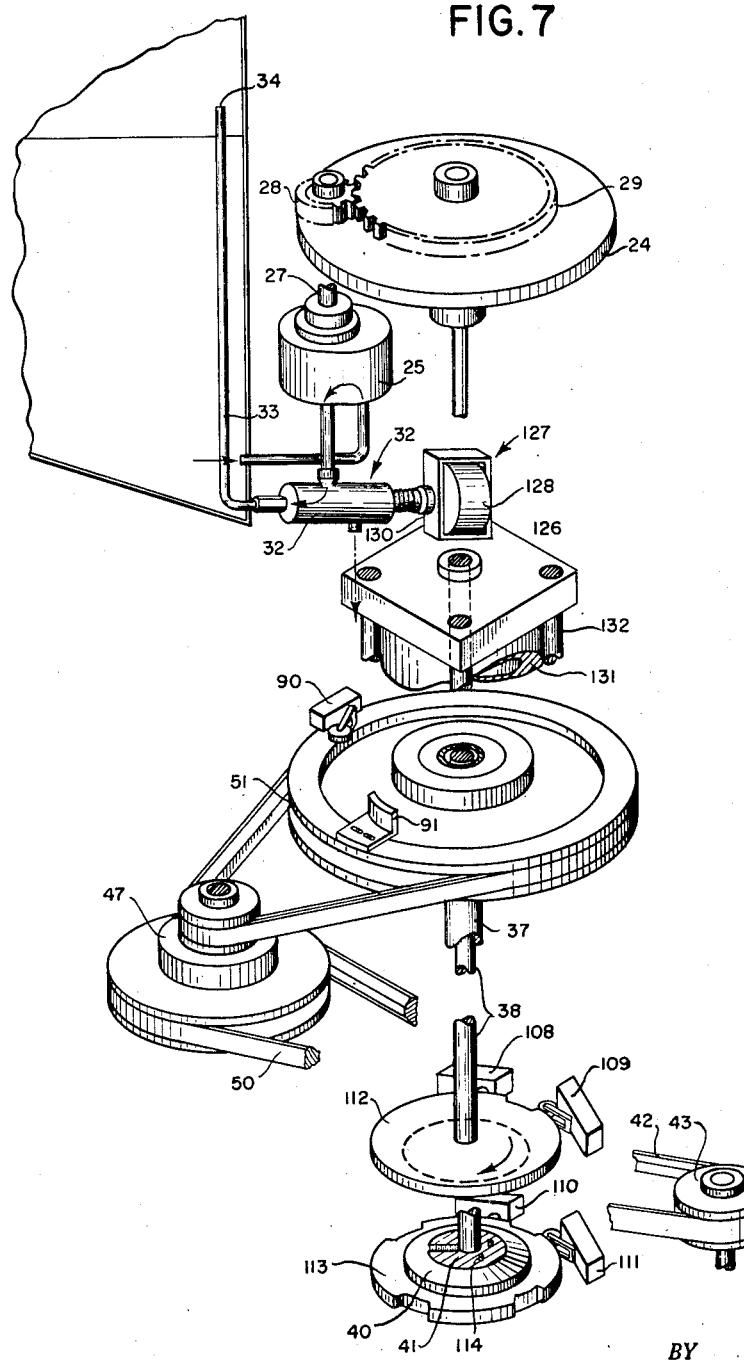

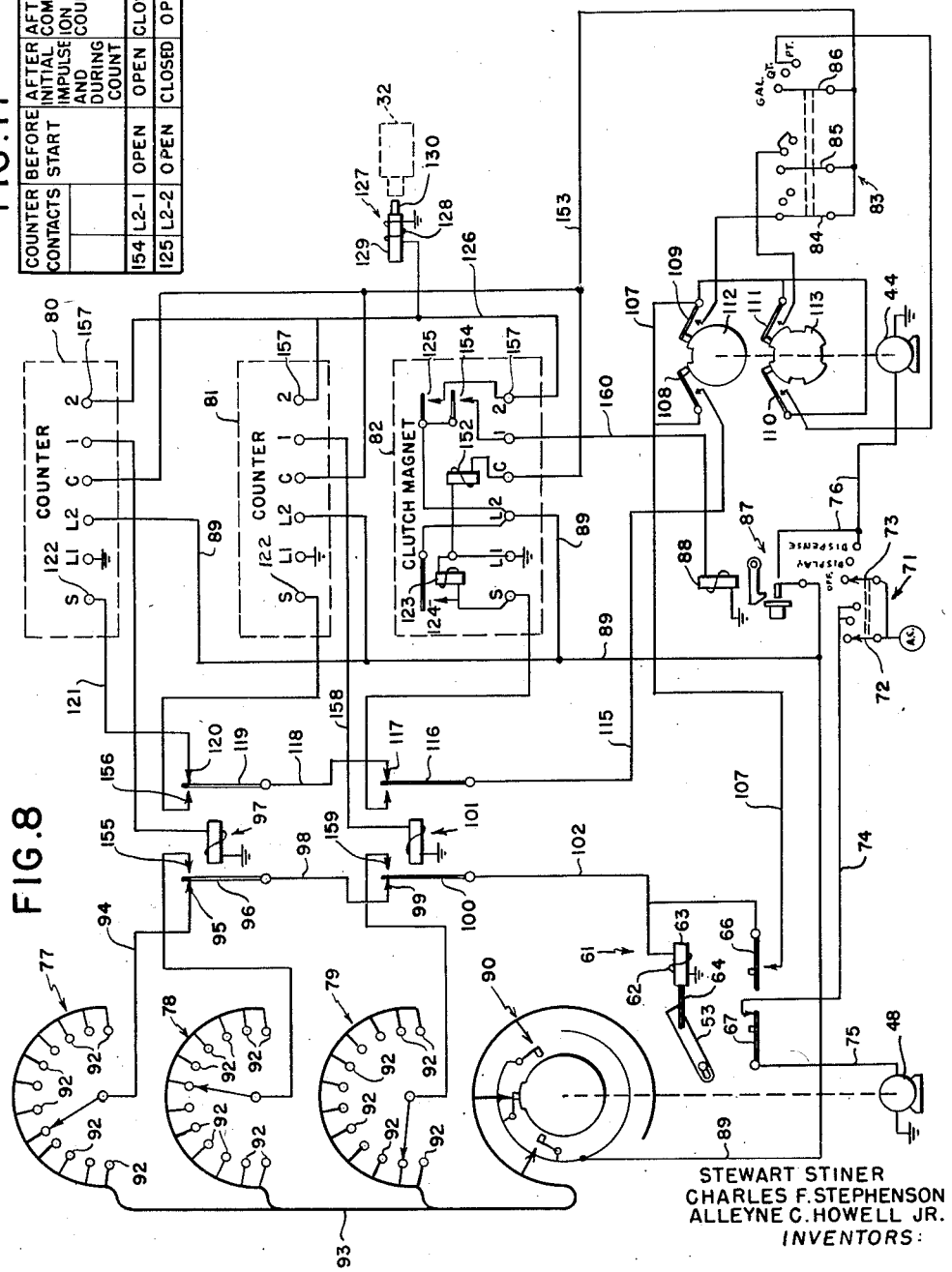

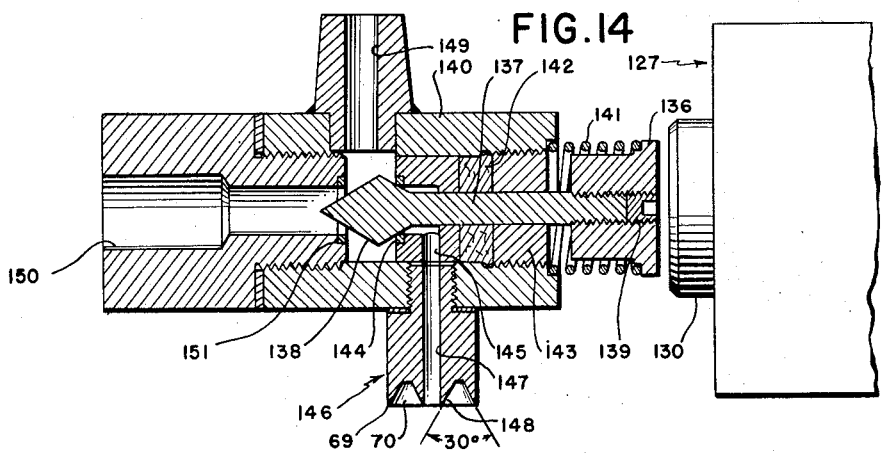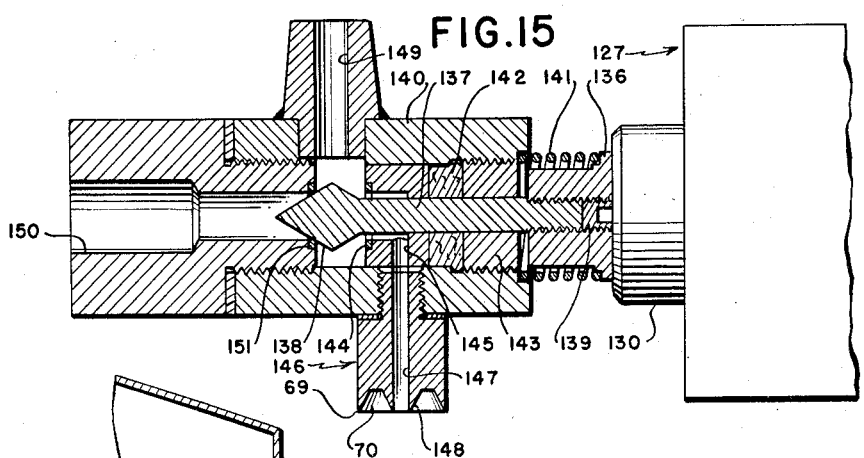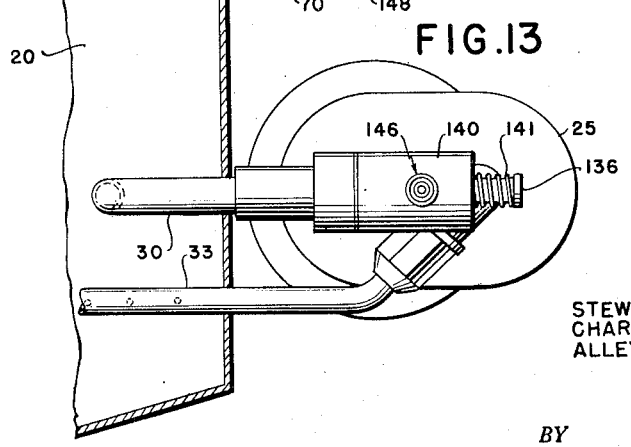

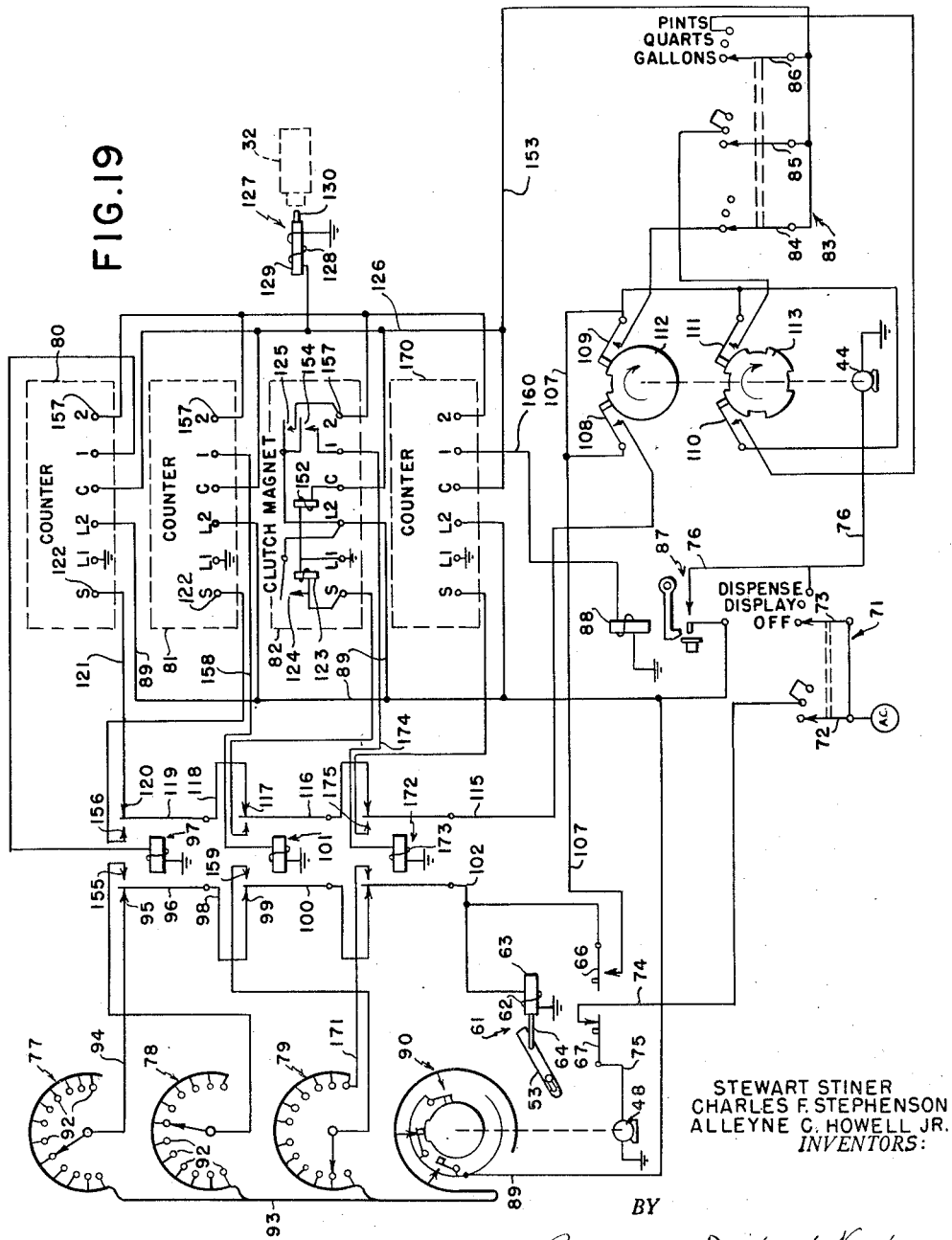

April 2, 1957  S. STINER ET AL  2,787,402
LIQUID PROPORTIONING AND DISPENSING APPARATUS
Filed April 16, 1952  9 Sheets-Sheet 9
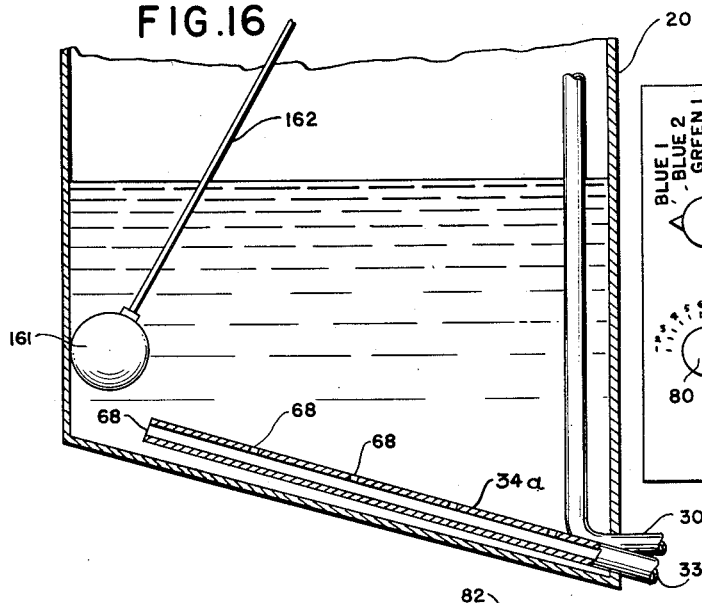
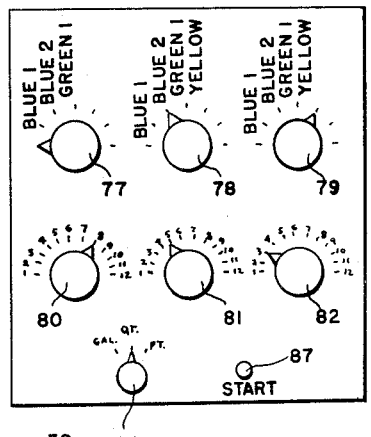
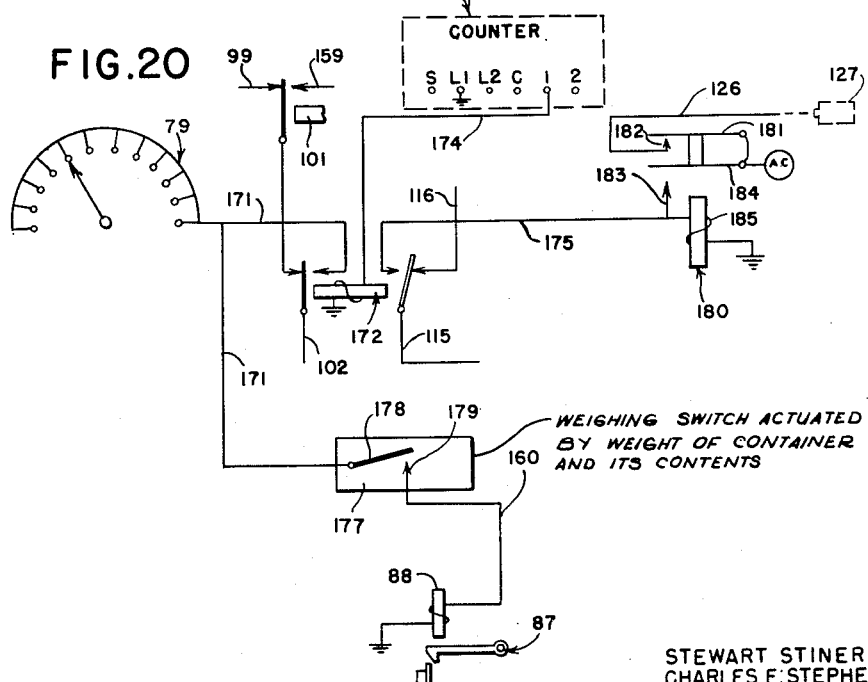
STEWART STINER
CHARLES F. STEPHENSON
ALLEYNE C. HOWELL JR.
INVENTORS
BY
Richardson, David and Nordon
ATTORNEYS

United States Patent Office 2,787,402
Patented Apr. 2, 1957

2,787,402

LIQUID PROPORTIONING AND DISPENSING APPARATUS

Stewart Stiner, Riverdale, and Charles F. Stephenson, New York, N. Y., and Alleyne C. Howell, Jr., San Francisco, Calif., assignors, by mesne assignments, to Color Carousel Corp., Staten Island, N. Y., a corporation of California Application April 16, 1952, Serial No. 282,652

26 Claims. (Cl. 222—76)

The present invention relates to liquid dispensing devices of the proportioning type, and more particularly to devices of this character in which an adjustably predetermined total quantity of liquid may be dispensed at will, the total quantity consisting of different liquids individually accurately measured in adjustably predetermined portions to produce the total quantity.

A feature of the invention resides in its inherent accuracy of volumetric measurement.

Generally, the invention consists of a plurality of storage tanks, an individual positive displacement pump associated with each tank, selecting mechanism for bringing a particular tank into dispensing position, a valve for each tank for controlling the dispensing action, and a metering device of the counting type which is responsive to the dispensing action of each pump and is arranged to actuate the valve for an accurately predetermined displacement of the particular pump which is operating to dispense liquid from its associated tank through its individual dispensing valve.

The selecting mechanism is capable of being preset to bring each of a plurality of preselected tanks successively into dispensing position, and a separate counting device may be preset to control the valve for a predetermined amount of pump action from each of the preselected tanks, while the tank is in the dispensing position.

The controls are so arranged that any desired formula may be easily selected, and the liquids will then be dispensed into a single container in the proportions preset on the controls, the total volume of liquid dispensed being in accordance with the capacity of the container, which capacity is likewise preset on the controls.

In the embodiment of the invention shown herein, it is contemplated that pigments such as those used in paints and each carried by a suitable liquid vehicle, are to be dispensed into containers of different commercial sizes to produce certain mixed colors, as determined from a color chart. The pigments disposed in the several storage tanks of the device are of standard colors which can always be accurately reproduced.

In paint mixing embodiments, the same individual positive displacement pump is also used to keep the pigment bearing liquid vehicle in circulation within each storage tank to prevent settling of the pigment. The dispensing valve may desirably include a nozzle of special construction to avoid dripping after the dispensing action has ceased.

When desired, the several tanks may be arranged to move slowly in a continuous manner to serve as an advertising display, with the pumps of all tanks pumping slowly to recirculate the liquid and thus prevent settling of the various pigments.

The invention also includes an improved selecting mechanism permitting any particular tank to be brought into the dispensing position above a container to be filled. The selecting mechanism preferably includes a checking or cushioning device to stop the tanks with a cushioned and retarded movement.

Provision is also made for a liquid level signal to indicate when the level of the liquid in any of the tanks has dropped to a point where refilling is required.

Other features and advantages of the invention will become apparent upon reading the following specification together with the accompanying drawing forming a part hereof.

Referring to the drawing:

Fig. 7 is a diagrammatic perspective view broken away to illustrate various elements of the complete device.

Fig. 8 is a schematic electrical circuit diagram.

Fig. 13 is an enlarged fragmentary bottom view showing a single valve and pump connected to the bottom of a storage container.

Fig. 14 is an enlarged cross-sectional view in elevation showing a three-way valve in its circulating position.

Fig. 15 is a view similar to Fig. 14 showing the valve of Fig. 14 in its dispensing position.

Fig. 16 is an enlarged fragmentary view showing a modified form of delivery nozzle for producing agitating jets in the stored liquid.

Fig. 17 is a table illustrating contact operation sequence of electrically actuated counters shown in Fig. 8.

Fig. 18 shows a control panel arrangement for presetting the desired selection of different liquids and the individual quantities of each liquid.

Fig. 19 is a schematic electrical circuit diagram of a modified form of the invention.

Fig. 20 is a fragmentary circuit diagram showing a modification of Fig. 19.

Figure 1:
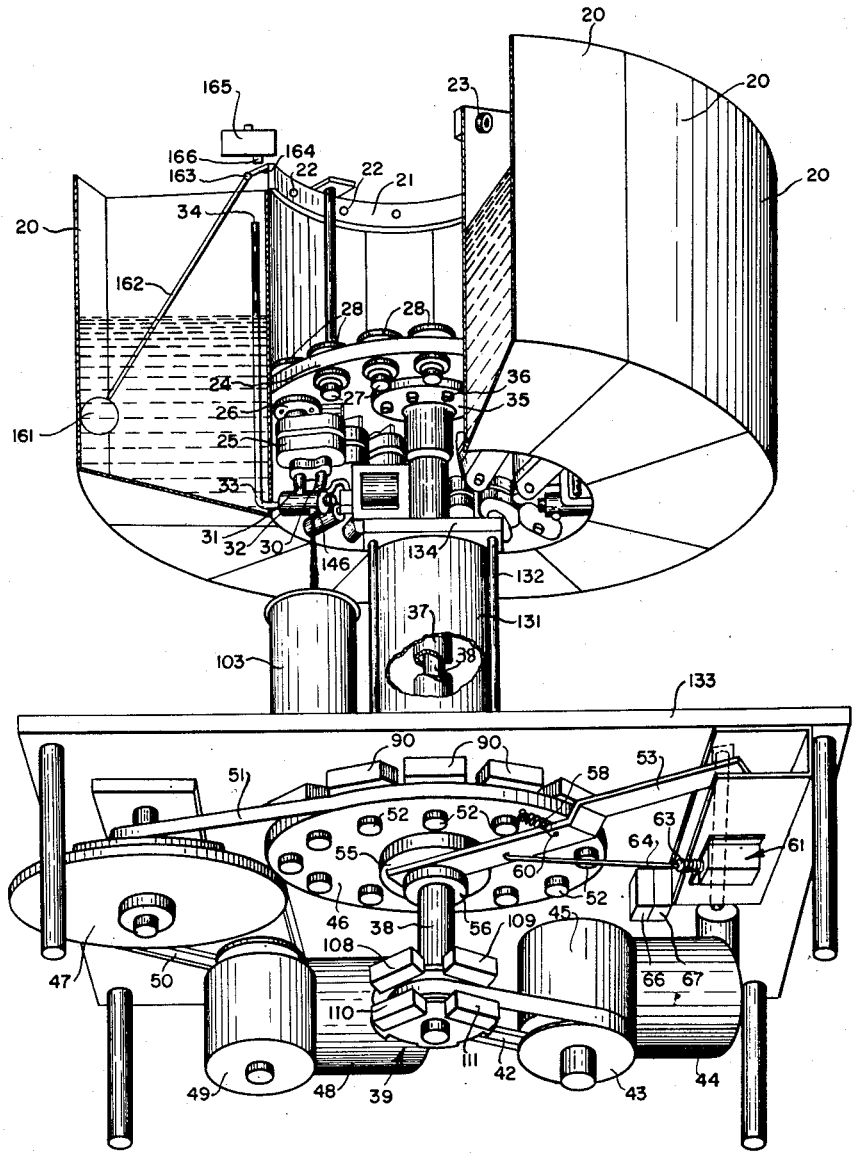
Fig. 1 is a perspective view, partly broken away, looking in an upward direction.

Referring to Fig. 1, a plurality of liquid storage tanks or reservoirs 20 are shown individually secured at their inner upper edges to an upper supporting ring 21 by screws 22 which engage threaded collars 23 carried by the tanks 20. The tanks 20 are disposed in a generally circular arrangement and have flat converging sides. The tanks 20 are convexly rounded at their outer end surfaces to form a smooth cylindrical periphery when mounted together as shown in Fig. 1. Their inner end surfaces are concavely rounded to conform to the curvature of supporting ring 21, and to bear against an upper plate 24 of the same diameter as supporting ring 21.

Rigidly secured to upper plate 24, are a plurality of positive displacement pumps, shown by way of illustration as gear pumps 25, an individual pump being provided for each storage tank. No specific type of positive displacement pump is shown since any type of pump is suitable for use with the present invention provided that it may be driven by a revolving shaft and that the volume of liquid pumped corresponds accurately to the number of revolutions of the driving shaft. A gear pump has been selected by way of illustration, since its characteristics meet these requirements, but its internal details have not been shown since they may be conventional in all respects.

Each gear pump 25 is supported from a supporting collar 26 secured to the under side of upper plate 24, the supporting collar including suitable bearings for the pump drive shaft 27.

Figure 2:
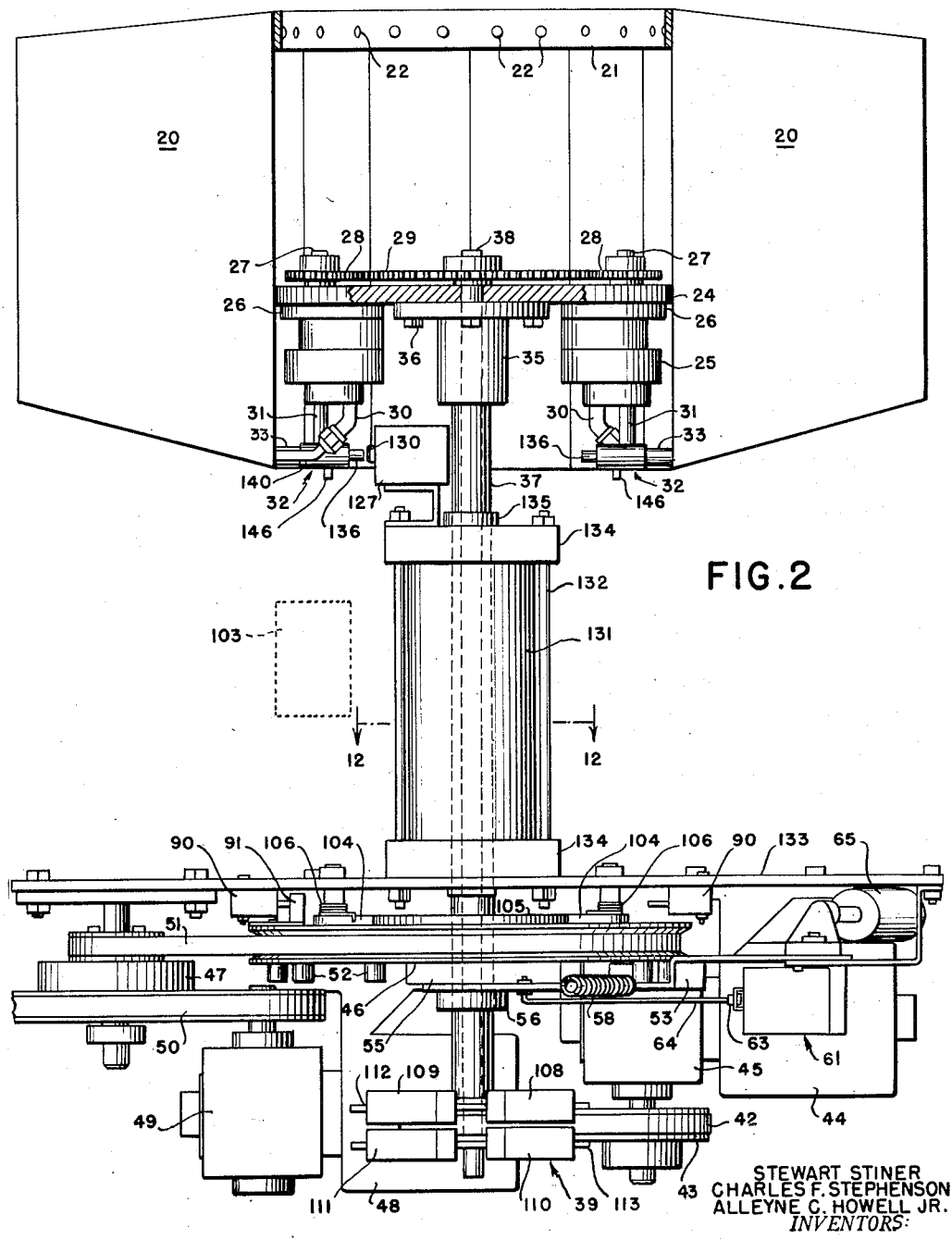
Fig. 2 is a sectional view in elevation.
Figure 3:
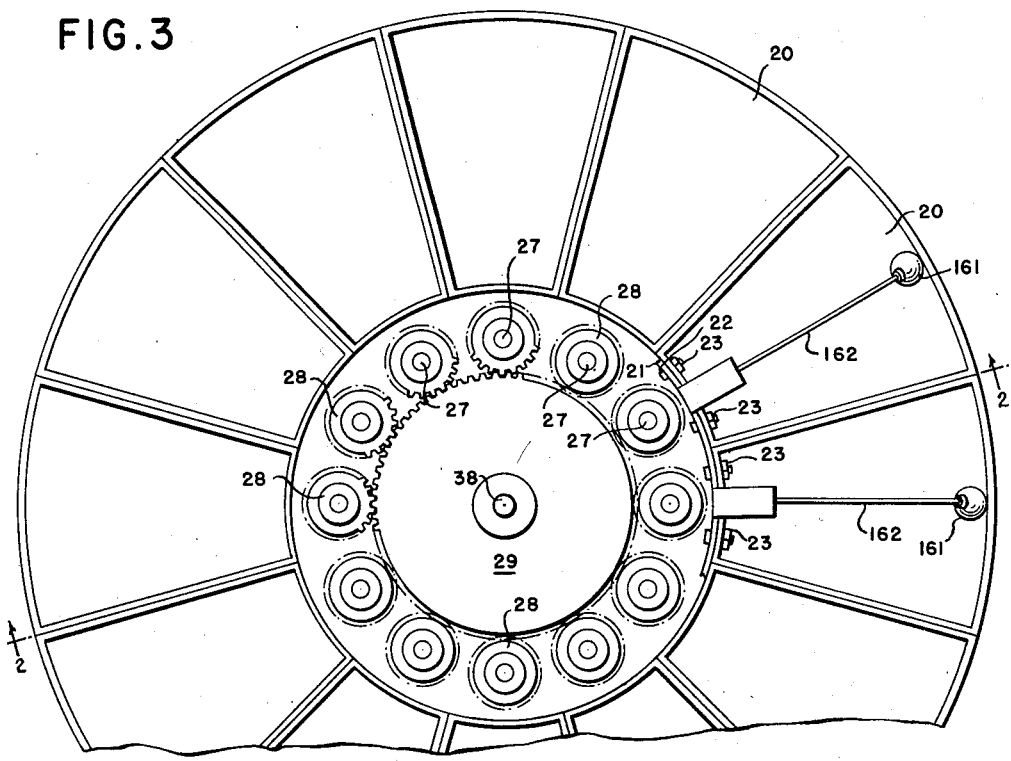
Fig. 3 is a fragmentary plan view.

Disposed on the upper side of upper plate 24 and fixedly secured to each pump drive shaft 27 is an individual pump drive gear 28, all of which mesh with a common main pump drive gear 29 (Figs. 2 and 3).

Each of the gear pumps 25 is provided with an inlet connection 30 from the bottom portion of its associated storage tank 20 and an outlet connection 31 which extends to a three-way valve 32. From valve 32 a further duct or connection 33 extends into the tank 20 to a point near its upper end, where it terminates in an outlet 34.

As shown in Figs. 1 and 7, the return duct 33 terminates in an outlet 34 which is located above the highest liquid level in each tank. In the embodiment illustrated, it is contemplated that the rate of flow of the recirculating liquid is sufficiently slow so that it will slowly ooze out of the cut-off end of duct 33 which forms the outlet 34, the outer surface of duct 33 acting as a guide surface for smoothly flowing the returning liquid back into the liquid in the tank without entraining air or creating air bubbles or undesirable turbulence in the tank liquid.

Where flow velocity is too great for the outer surface of duct 33 to act as a guide or flowing surface, any desired known type of turbulence preventing device may be associated with the outlet 34. Outlet 34 instead of terminating above the liquid level may comprise a submerged nozzle 34a (Fig. 16) or similar device having orifice 68 for producing one or more submerged jets which create agitating currents within the liquid.

With the valve 32 in its normal position, liquid is drawn from the bottom of the tank 20 through the pipe 30 into the inlet side of gear pump 25. Gear pump 25 forces the liquid into the pump outlet connection 31 and through valve 32 into pipe 33 and outlet 34 from which the liquid drops back into the main supply contained in the storage tank 20. So long as gear pumps 25 are in operation, the liquid stored in each tank 20 is recirculated, thereby preventing the settling of any solids or the accumulation thereof at the bottom of any of the tanks 20.

The upper plate 24 is secured to a supporting flange 35 by bolts 36 and the upper plate 24 and flange 35 are carried by a hollow vertical drive shaft 37. Because hollow shaft 37 carries the entire weight of all of the storage tanks 20 together with their associated gear pumps 25 and valves 32, suitable thrust bearings must be provided, together with bearings to prevent lateral movement of the hollow shaft 32. These are not specifically shown, but may be any desired type and may be located in any desired positions in known manner.

Figure 9:
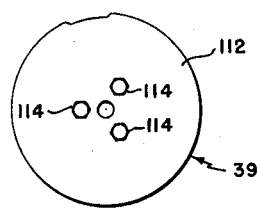
Fig. 9 is a plan view of a counting cam assembly.
Figure 10:
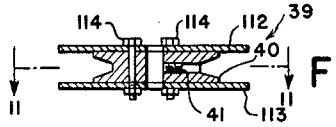
Fig. 10 is a sectional view in elevation of the cam member shown in Fig. 9.
Figure 11:
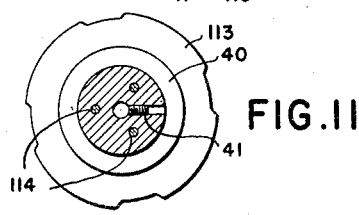
Fig. 11 is a plan sectional view taken along the line 11—11 of Fig. 10.
Figure 12:
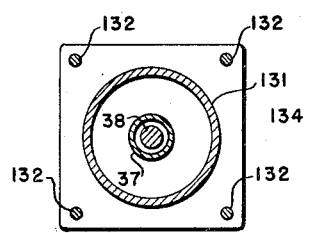
Fig. 12 is a plan sectional view taken along the line 12—12 of Fig. 2.
Figure 4:
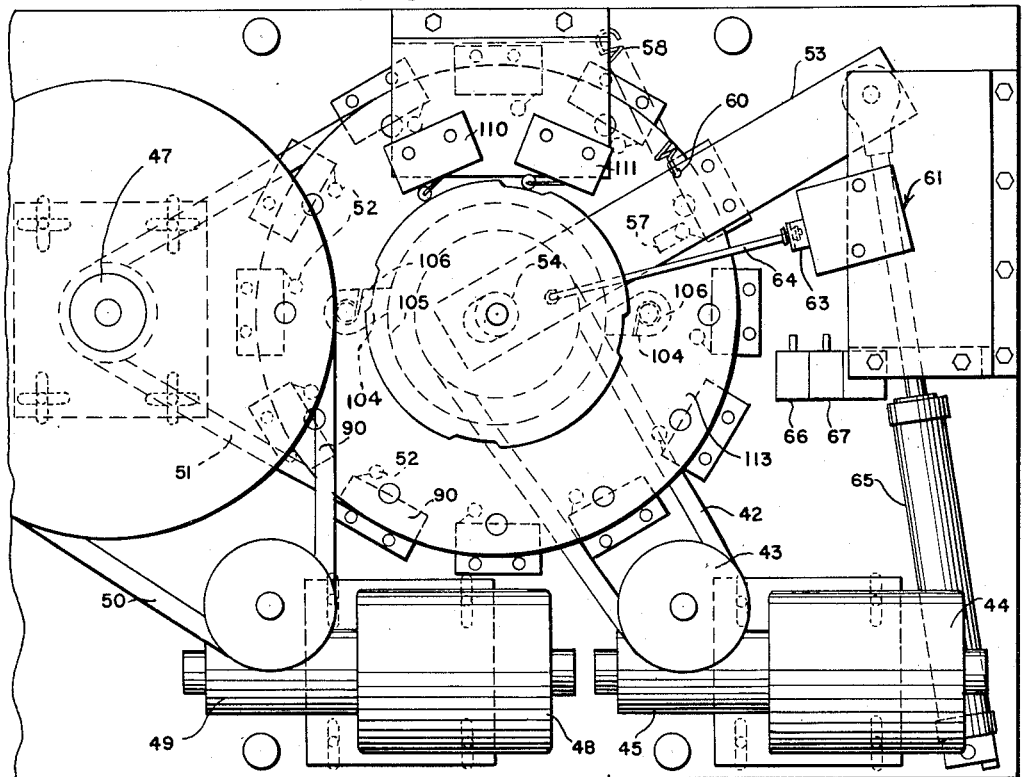
Fig. 4 is a bottom view.
Figure 5:
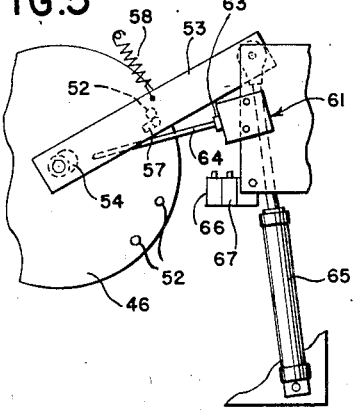
Figs. 5 and 6 are diagrammatic views illustrating the action of a selective rotation stopping mechanism shown in Fig. 4.
Figure 6:
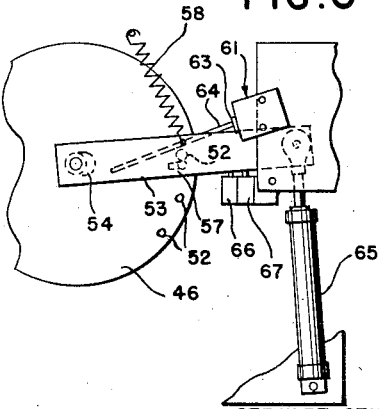

Disposed within hollow shaft 37 is a pump drive shaft 38 which is fixedly connected to the main pump drive gear 29 at its upper end and at its lower end to a volumetric counting cam assembly designated generally as 39 (Figs. 9 to 11), which comprises a sheave 40 secured to the shaft 38 by a set screw 41. Sheave 40 is connected by a V-belt 42 to a further sheave 43 which is driven by a pump drive motor 44 through a speed reducing mechanism 45. Assuming hollow shaft 37 to be stationary, motor 44 will drive all of the pumps 25 through main pump gear 29 and pump drive shaft 38, since all of the individual pump gears 28 mesh with the main pump drive gear 29.

The hollow shaft 37, at its lower end, carries a peripherally grooved selector wheel 46 which is driven through a speed reducing pulley 47 by a motor 48, the driving connection to the motor 48 comprising a speed reducing mechanism 49 and two V-belts 50 and 51, the V-belt 50 extending from motor speed reducer 49 to pulley 47 and belt 51 from pulley 47 to the periphery of the selector wheel 46.

Motor 48 thus drives hollow shaft 37, carrying with it all of the tanks 20, valves 32 and pumps 25. With pump drive shaft 38 stationary, all of the individual pump drive gears 28 will operate as planetary gears and roll around the stationary main pump drive gear 29 in mesh therewith and will thus simultaneously operate their respective pumps 25 at a reduced speed suitable for recirculation of the liquids in the several storage tanks 20. By the addition to the group of tanks 20 of suitable coloring, lettering, or the addition of indicia, this slow speed rotation of the group of tanks 20 may be utilized for a sales promotional display effect accompanying the slow rotary movement of the group of tanks.

Disposed on the under side of selector wheel 46 are a plurality of stop studs 52. A floating stop arm 53, provided with a radially elongated slot 54 through which hollow shaft 37 passes freely, is slidably retained axially fixedly positioned on hollow shaft 37 between an upper collar 55 and a lower collar 56, thus being freely radially movable inwardly and outwardly with respect to selector wheel 46 within the limits of radial travel imposed by the length of the slot 54. On its upper surface, floating arm 53 carries a stop-dog 57 which is selectively engageable with any one of the stop studs 52 when the arm 53 is in its radially outward position. In the inward position of arm 53 the stop studs 52 pass freely by the stop-dog 57.

Arm 53 is yieldingly urged to swing in a direction opposite to the direction of rotation of shaft 37 by a tension spring 58, one end of which is secured to a fixed bracket 59, the opopsite end being secured to arm 53 at a hole 60 therein. A solenoid designated generally as 61 and comprising an operating winding 62 and a spring-pressed plunger 63 is shown provided with a link member 64 which extends to the floating arm 53. Upon energization of operating winding 62, the plunger 63 is drawn inwardly within the solenoid 61 and link 64 thereupon draws the floating arm 53 radially outwardly into a position where the dog 57 is placed in the path of travel of the studs 52. One of these studs will thereupon engage the dog 57 and will force arm 53 to rotate along with the selector wheel 46. This action is retarded and damped by suitable mechanism illustratively shown as an air check 65, the air check 65 being arranged for quick return action in the usual manner. The air check 65 may conveniently be of the type commonly used in spring operated door closers to prevent the slamming of screen doors or the like.

Upon being drawn outwardly by solenoid 61, the floating arm 53 will travel along with the particular stud 52 engaged by dog 57 until it reaches its limit of travel at which point two switches 66 and 67 are actuated, the purpose of this actuation being more fully set forth below.

Referring to the schematic electrical circuit diagram, Fig. 8, a three position main switch 71 is shown comprising two poles 72 and 73 which are electrically connected together and mechanically interlinked to operate together. The main switch is shown in its "Off" position, in which the device is entirely deenergized. When the main switch 71 is advanced in a clockwise direction to its next, or "Display" position, pole 72 applies one side of the commercial power supply, designated "A. C.," via a conductor 74, normally closed switch 67, and another conductor 75 to the selector wheel driving motor 48, the other side of motor 48 being connected to the other side of the commercial power supply, represented by the conventional circuit symbol for ground.

This energizes motor 48 which drives the selector wheel 46 and thereby rotates hollow shaft 37 and the several storage tanks 20 together with the assembly of gear pumps 25. Since the individual pump driving gears 28 are being rotated with respect to the main pump driving gear 29, which is stationary for this position of the main switch and with which they are in mesh, all of the gear pumps 25 are thus driven at relatively low recirculatory speed, thereby each circulating and recirculating the liquid in its associated storage tank 20. Apart from this action, the remainder of the device is not activated.

Upon turning switch 71 further in a clock-wise direction to its next, or "Dispense" position, "A. C." is applied to a conductor 76 which energizes pump motor 44, thereby driving all of the pumps 25 whether or not the selector wheel and assembly is rotating. This action is preparatory to the dispensing of the desired formulation of the several liquids. The desired formulation of different liquids stored in the tanks 20, is then, or has been previously preset upon three liquid or color selection dials 77, 78 and 79, and the amount of each liquid to be dispensed is likewise preset on three electrically actuated counters 80, 81 and 82 which determine volumetrically the respective amounts of each liquid as selected on the color selection dials 77, 78 and 79.

If a particular total volume is desired, the setting of the several dials will be so arranged that the total number of volumetric units preset on the counters will correspond to this total volume, the total number of counts or units of minimum volume ratio being duly apportioned amongst the several colors or other liquids in accordance with proportions determined by the desired formula which is to be dispensed.

The size of the container which is to be filled is then preset on a three pole three position switch 83 comprising the three poles 84, 85 and 86. In the embodiment of the invention which is illustrated, the three positions correspond to gallons, quarts and pints, respectively, as the switch 83 is rotated in a clockwise direction.

A starting switch 87 of the locking push button type is shown provided with a releasing magnet 88, and the locking push button of this switch is next depressed to commence the dispensing operation.

Fig. 18 shows a simplified control panel arrangement. Assume for example that it is desired to produce a quart of paint of a particular shade, such as robin's egg blue. This color is to be produced by mixing of certain pigments of standard colors stored in tanks 20 with a quart of white paint in a standard container. Reference to a color chart will advise the operator that 8 units of a standard blue are required, 2 units of a standard green, and 1 unit of a standard yellow.

The operator then sets a presettable quantity switch 83 on the control panel to its quart position. He also sets a similar presettable color switch 77 to the desired blue, setting the knob of its associated counter 80 to the desired quantity of 8 volumetric proportioning units. He next sets a color switch 78 to the desired green and the knob of its associated counter 81 to 2 units. Switch 79 is similarly set to the required yellow and the knob of its associated counter 82 to one unit. Dispensing action is then commenced by pressing push button 87.

As explained in detail below, if switch 83 is set for gallons, instead of quarts, there will be four times as much pump action per unit, the counters, however, will still count to the same number of counts, namely 8, 2 and 1, but four times the volume of pigment will be dispensed for each individual count in the "Gallons" position of switch 83 as in the "Quarts" position.

After the controls have all been properly set and starting push button 87 actuated, the machine will automatically dispense the three desired colors in the respective amounts and proportions desired, and will then automatically stop.

In the foregoing example, a selected group of pigments to be added to white paint were considered. A mixture of prepared paints could also be dispensed. The device is inherently suitable for dispensing liquids of any type, such as those used in the preparation of cocktails or a combination of syrups for carbonated beverages, or medical preparations, industrial compounds and the like.

Pressing of the starting button of switch 87 closes its contacts applying "A. C." from conductor 76 via a conductor 89 to one contact of a group of stationary reservoir positioning or liquid selecting switches each designated 90. Although twelve of these switches 90 are actually provided and are shown in most of the several figures of the drawing, Fig. 8 shows only three, the other nine being omitted for simplicity of illustration.

On its upper side, the selector wheel 46 carries a switch actuating cam 91 (Fig. 7) which successively actuates each of the twelve stationary color selecting switches 90, causing each switch, as it is actuated, to close its contacts for the duration of its engagement by the switch actuating cam 92. When the particular stationary color selecting or reservoir positioning switch 90 is actuated, which corresponds to the color selected by the first presettable color selection switch 77, a circuit is completed through the selected one of its switch-points 92 via one of the conductors of a twelve conductor cable 93 to its switch arm. Each of the twelve conductors of cable 93 is connected individually from each of the corresponding switchpoints 92 of the presettable color selecting switches 77, 78 and 79 to the corresponding stationary switches 90 to be actuated by the color selecting cam 91 for the desired color selected by any of the presettable color selecting switches 77, 78 and 79.

The circuit completed to the selected switchpoint 92 of the first presettable color selecting switch 77 continues via a conductor 94, through the normally closed contacts 95—96 of a double pole double throw relay 97, via a further conductor 98, the normally closed contacts 99—100 of another double pole double throw relay 101 and a conductor 102 to the operating winding 62 of the solenoid 61, causing it to draw in its plunger 63.

Solenoid plunger 63, acting through link 64 draws floating arm 53 radially outwardly causing its dog 57 to engage the stop stud 52 corresponding to the color selected on the first presettable color selection switch 77. As described above, the selector wheel 46 and the storage tanks 20 together with their associated pumps 25 and valves 32 will come slowly to rest under the retarding action of the air check 65 with the particular container 20 and its associated valve 32 corresponding to the selected color coming to rest in the dispensing position, directly over the container 103 (Fig. 1) into which liquid is to be dispensed.

As the rotation of the tanks 20 ceases, floating arm 53 actuates switch 66 and 67. Switch 67, whose contacts are normally closed, opens the circuit of motor 48 cutting it off. Backward travel is prevented by friction pawls 104 (Fig. 2) which engage a disc 105 carried by selector wheel 46, the pawls 104 being continuously urged into frictional engagement with the disc 105 by individual helical torsion springs 106. The two switches 66 and 67 therefore remain actuated.

The normally open switch 66, in its actuated position, establishes a circuit from the energized conductor 102, via a conductor 107 to a group of four cam actuated volumetric counting switches, 108, 109, 110 and 111. This group of four switches is actuated by the counting cam assembly 39, as shown in detail in Figs. 9 to 11. The cam assembly 39 comprises an upper cam 112 having a single notch and a lower cam 113 having four equally spaced notches, the pump drive sheave 40 being interposed between the upper and lower cams 112 and 113 respectively. The cams 112 and 113 are held together with the sheave 40 to form the assembly 39 by a plurality of bolts 114.

In the course of any single revolution of pump drive shaft 38, the upper cam 112 will first cause a single closure of switch 108 followed by a single closure of switch 109. Similarly, the lower cam 113 will cause the first of four closures of switch 111 immediately following the closure of switch 108 by the upper cam 112. The switch 110 is so positioned with respect to switch 111, that each of the four notches of lower cam 113 will actuate the switches 110 and 111 at different time intervals, preferably equally spaced.

The contacts 109, 110 and 111 are volumetric measurement contacts which produce a series of impulses directly correlated to the pumping action of the pumps and independently of any time intervals. The pumps 25 are all positive displacement pumps and the volume of liquid delivered is substantially independent of the speed of pump operation. All of the pumps are driven by the common gear 29 through the common pump drive shaft 38. Thus, irrespective of which one of the several pumps 25 may be actually dispensing liquid, the volume dispensed from any particular tank is positively correlated to the angular displacement of pump drive shaft 38 while its associated valve 32 is in its dispensing position.

The volumetric pulsing contacts 109, 110 and 111 are all actuated by the cam assembly 39 comprising upper and lower cams 112 and 113, respectively. This cam assembly is fixed to the pump drive shaft 38. Accordingly, if any of the valves 32 is held in its dispensing position by means later to be described, and the duration of the interval during which it is so held is determined by counting volumetric impulses from cam assembly 39, then the valve will be in its dispensing position on a purely volumetrically determined basis which is entirely independent of pump speed, voltage fluctuations in the powed line, or other factors which could otherwise impair the volumetric accuracy of measurement of the dispensing action.

If desired, the angular interval between the actuation of switches 108 and 109 may be made adjustable. This may be accomplished by raising cam 108 to a higher level and mounting an angularly adjustable actuating arm (not shown) on the upper surface of cam 112 which independently actuates only switch 108. This may also be accomplished by so mounting switch 108 that its position is circumferentially adjustable with respect to cam 112.

Assuming the total volume, or container capacity switch 83 to be in the "Gallons" or extreme counterclockwise position, the first passage of the single notch of upper cam 112 will first close the contacts of switch 108. A circuit is then established via a conductor 115, normally closed contacts 116—117 of relay 101, conductor 118, normally closed contacts 119—120 of relay 97, and conductor 121 to the "S" or "Start" terminal 122 of pre-settable counter 80. The internal connections of the three counters 80, 81 and 82 are shown only in the case of counter 82, the three counters being of identical construction.

Each counter comprises a clutch magnet 123 which becomes energized by the application of "A. C." to the "S" terminal of the counter. Energization of the clutch magnet 123 conditions the counter to begin a count, and deenergization releases the clutch, resetting the counter to its initial or zero condition.

Energization of the clutch magnet 123 causes closure of a pair of locking contacts 124 which maintain the clutch magnet 123 in an energized condition from "A. C." at conductor 89, after the original energizing circuit has been broken. Unless clutch magnet 123 is energized, the application of counting impulses to the counter will be of no significance since the counting mechanism will not operate.

With clutch magnet 123 energized, the counter 80 is prepared to start counting to its preset count, appropriately adjustable mechanism controlled by control panel knob 80 (Fig. 18) being provided for presetting the total number of impulses to be counted. The arrangement is generally similar to that shown in U. S. Patent No. 2,175,865 issued October 10, 1939, to C. L. Anderson, except that the counter used in the present invention operates with a ratchet type stepping magnet instead of a timing motor as shown in the Anderson patent.

With clutch magnet 123 energized, the counter is prepared to operate and to close contacts 125 between terminals L2 and 2. Terminal L2 was energized by connection to "A. C." via conductor 89 when the start button 87 was pressed.

Switch 109 is then closed applying the initial impulse or zero count, which causes contacts 125 to close, establishing an energizing circuit via a conductor 126 to a valve actuating solenoid 127 having an operating winding 128 and a plunger 129. The plunger 129 is connected to an outwardly projecting actuating member 130 (Figs. 7, 14, 15) which is forced outwardly from the solenoid 127 as its magnetic plunger 129 is drawn inwardly upon energization of its operating winding 128.

The valve actuating solenoid 127 is fixedly secured to the upper end of a supporting column comprising a hollow cylindrical member 131 and four stay bolts 132 which clamp the supporting column against a base plate 133, the cylindrical member 131 being held between upper and lower column end plates 134. The valve actuating solenoid 127 is mounted on the upper column end plate 134 in operative relationship with respect to any valve 32 which is in dispensing position. The upper column end plate 134 may conveniently be provided with a bearing 135 for the journaling of the hollow shaft 37.

At the time when the selector wheel 46 came to rest, the valve 32 of the selected tank 20, as determined by presettable switch 77, was accurately positioned by floating stop arm 53 in close proximity and in juxtaposition to the actuating member 130 of the valve solenoid 127. Energization of the valve actuating solenoid 127, therefore, causes the actuating member 130 to press upon the valve operating plunger 136.

Referring to Figs. 14 and 15, the valve operating plunger 136 is threadedly connected to a valve stem 137 having a head 138 comprising two coaxial right circular conical surfaces tapering away from each other. The valve operating plunger 137 may be locked in a desired position of adjustment with respect to the valve stem 137 by a locking set screw 139. The valve operating plunger 136 is urged outwardly away from valve body 140 by a helical compression spring 141.

The valve stem 137 passes through a packing gland 142 which is suitably compressed to maintain a liquid tight seal by a packing gland screw 143. The compression spring 141 normally urges one of the conical faces of the head 138 of valve stem 137 into engagement with a valve seat 144 shutting off a dispensing outlet passage 145 which communicates with the dispensing discharge nozzle 146, the valve stem passing through the upper portion of outlet passage 145 which terminates in valve seat 144.

The nozzle 146 is especially constructed to prevent dripping in order to avoid spoiling a particular mixture by dropping a drop of an undesired color or liquid therein after discharge from any nozzle 146 has presumably ceased. The non-dripping nozzle 146 has a circular area at its bottom and a downwardly directed discharge passage 147 therethrough which communicates at its upper end with dispensing outlet passage 145 of valve 32. The discharge passage 147 terminates in a substantially knife-edged periphery 148. Knife edge 148 is formed by a circular groove 70 in the otherwise flat circular area at the bottom of nozzle 146. The groove 70 is of inverted V-shaped cross-section, and the walls formed between passage 147 and the inner arm of the V, diverge at an angle of substantially thirty degrees. The angle of divergence is critical, and an angle of the order of thirty degrees must be used in order to obtain the desired non-dripping performance. The outer edge 69 of groove 70 acts as a guard for knife-edge 148, protecting it from mechanical injury.

The valve 32 further comprises an inlet passage 149 and a normal or recirculating outlet passage 150. A valve seat 151 is disposed to engage one of the conical surfaces of valve stem head 138 to shut off flow through the normal outlet passage 150, which shutting off action takes place when valve operating plunger 136 is pressed for dispensing as shown in Fig. 15.

The two outlet passages 147 and 150 thus terminate in the valve seats 144 and 151 respectively, which constitute two orifices lying in spaced parallel planes, a line joining the centers of the two orifices being substantially perpendicular to the planes, with the valve stem head 138 being movable along this line.

In operation, one or the other of the two conical surfaces of valve head 138 is in engagement with valve seat 144 or valve seat 151. The pressure of liquid entering the inlet passage 149 is always such as to create a pressure tending to maintain the valve in whichever of its two positions it may be in, either as in Fig. 14 or as in Fig. 15. In transit between these two positions, however, the valve head 138 never completely obstructs the flow through the inlet passage 149, the transitional hydraulic resistance being maintained substantially constant insofar as the valve head 138 is concerned, to prevent hydraulic shock to the pump 25 which is supplying liquid to the inlet passage 149 through the pump outlet connection 31.

Upon energization of solenoid 127 its actuating member 130 therefore presses valve actuating plunger 136, causing valve stem head 138 to transfer from engagement with valve seat 144 to engagement with valve seat 151. This shuts off the normal recirculating flow of liquid through outlet passage 150 and pipe 35 and opens the dispensing passage 145 through nozzle 146. The liquid thus dispensed falls into the container 103 which is positioned directly below the nozzle 146 of the particular valve 32 for the selected color or liquid. When solenoid 127 is deenergized, the valve head 138 resumes engagement with valve seat 151 and thereupon discharge ceases and recirculation is resumed, the gear pump 25 remaining in continuous operation throughout the entire cycle.

After the predetermined preset count of counter 80 has been reached as a result of the required number of one-eighth, one-quarter or complete revolutions of pump drive shaft 38 and a corresponding series of counting impulses being applied to its counting magnet 152 via conductor 153 with its clutch magnet 123 in a continuously energized condition, the last volumetric counting impulse opens its contacts 125 which were maintained closed during the count, and simultaneously causes closure of its contacts 154 thereby establishing a circuit between its terminals L2 and 1. The contacts 125 remain open, deenergizing the valve solenoid 32 and terminating the dispensing action. When contacts 154 close, this last contact condition will remain established until clutch magnet 123 is deenergized, this deenergization thereupon preparing the counter for a new cycle.

Closure of contacts 154 of counter 80 energizes relay 97. Relay 97 then transfers conductor 98, which controls selector wheel solenoid 61, from (normally closed) contact 95 to (normally open) contact 155 of relay 97 and hence the solenoid 61 from control by the first presettable color selector switch 77 to control by the second presettable color selector switch 78.

The counter clutch magnet control lead 118 is simultaneously transferred from (normally closed) contact 120 to (normally open) contact 156 of relay 97, thus preparing to count up to the preset count established on the second counter 81 for the second liquid, or color selection, by energizing its "S" terminal and thus actuating and locking in its clutch magnet 123.

If a different color has been selected on the second presettable color switch 78, solenoid 61 will be deenergized and its spring-pressed plunger 63 will move floating arm 53 radially inwardly disengaging dog 57 from stop stud 52, tension spring 58 will then restore floating arm 53 quickly to its normal position since air check 65 provides for quick return action, and switch contacts 66 will open. Simultaneously, contacts 67 will close, thereby starting the motor 48 which drives selector wheel 46 and the selector wheel 46 will again start in motion.

It will come to rest at the selected color preset on the second presettable color selector switch 78 as described above for the first presettable color selector switch 77 which is now out of circuit.

The next, or initial impulse will close the contacts 154 of the second counter 81, the first counter 80 being out of circuit, and these contacts will energize the valve solenoid 127 via conductor 126 which is connected to counter terminal 157, this terminal also being designated "2."

At the completion of the preset count on the second impulse counter 81, its contacts 154 will close and energize relay 101 via conductor 158. Energization of relay 101 transfers the selector wheel control conductor 102 from (normally closed) contact 99 of relay 101 to (its normally open) contact 159, again starting the color selecting action described above, but under control of the third presettable color switch 79.

The third impulse counter 82 will now proceed to count the preset number of impulses, and upon closure of its contacts 154 at the completion of the count, reset magnet 88 of the starting push button 87 is energized via conductor 160, unlocking push button 87 and deenergizing all of the previously described circuits except the motors 44 and 48 which remain energized ready for the next dispensing action. If no further dispensing is required, the main switch 71 may then be turned back to its intermediate position or "Display" position where only motor 48 is in operation rotating the group of liquid reservoirs 20 at slow speed for display purposes.

It should be noted that all of the clutch magnets 123 were successively locked in through their own contacts 124 which, in turn, are connected to "A. C." via conductor 89. Deenergization of conductor 89 therefore simultaneously unlocks all the clutch magnets and resets all three counters, so that they are prepared to count again in sequence, as described above. Although during each counting operation, the counting magnets 152 of all three counters are simultaneously pulsed since they are energized by a common conductor 153, no counting action will take place in any counter until its clutch magnet 123 has first been locked in. As has been described, the energization of the clutch magnets is controlled sequentially by means of relays 97 and 107.

The above operation has been described with the container size or total volume switch 84 in its first, or "Gallons" position. When switch 84 is turned clockwise to its next, or "Quarts" position, the switch contacts 111 which are actuated by lower cam 113 are substituted for contacts 109 actuated by the upper cam 112, so that lower cam contacts 111 control the counting magnets 152 of the counters 80, 81 and 82.

It should be noted that the lower cam 113 is provided with four notches, whereas the upper cam 112 has but a single notch. The counting magnets will therefore be actuated four times for each revolution of the pump drive shaft 38 instead of once as in the case of the gallons cam actuated switch 109. The volume of liquid displaced by any of the pumps 25 in the course of a single count will therefore be one quarter as much for the "Quarts" position of the switch 83, as for the "Gallons" position. However, the relative proportions established by the settings of the three counters 80, 81 and 82 will be maintained.

When the container capacity switch 83 is operated to its next, or "Pints" position, the counter magnets 152 are energized alternately by switch contacts 110 and 111, each contact being actuated four times producing eight impulses during each revolution of pump shaft 38 by the lower cam 113, thus reducing the total pump displacement required to reach any preset count to one-eighth of the displacement required with switch 83 in its "Gallons" position.

It should also be noted that the dispensing of liquid will not commence, except at a predetermined position of the counting cam assembly 39 with respect to the counting impulse switches 109, 110 and 111. The position of the single notch in upper cam 112 is the same as that of one of the four notches in the lower cam 113. This assures that the initial contact in the clutch magnet will not occur until immediately prior to the initial impulse to any counter, irrespective of the position of the container capacity switch 83. This is because no counter can be conditioned to accept the initial impulse until the clutch control impulse switch 108 has first locked in the clutch magnet of the particular counter being used. This is immediately followed by the zero impulse from either gallons counting switch 109 or quarts counting switch 111, pints counting switch 110 being open at this time.

Unless this precaution is taken the valve 32 which controls the dispensing action would not necessarily be actuated at the same point with respect to the position of counting cam assembly 39, and this would result in a random effect with respect to the beginning of the dispensing action relative to the counting action. This random effect would impair the desired accuracy of volumetric measurement.

In order to direct attention to the fact that the liquid level in one or more of the containers is low, and that refilling is required, each container 20 is provided with a ball float 161 (Fig. 1) carried by an arm 162, the arm 162 being movably secured to a fixed pivot at 163 and having an extending portion 164 whose end is shown in proximity to the upper supporting ring 21. When the liquid level drops sufficiently low, arm 162 pivots about 163 and the extending portion 164 rises. A stationary switch mechanism 165 is fixedly positioned directly above the path of travel of the extending portions 164, and its actuating lever 166 will be engaged by any of the extending arm portions 164 which has risen to a sufficient extent as a result of the lowering of the liquid level in its associated tank. The contacts of switch 165 may be connected to an alarm circuit of any desired type which may comprise an audible signal or a visual signal, or both, together with facilities for silencing the audible signal, if desired.

Fig. 19 shows a modified form of the invention particularly adapted for use in the dispensing of colored pigments carried by a suitable liquid vehicle and which pigments are to be mixed with white paint. It is assumed that a one gallon container of white paint will be shipped from the factory exactly 4 ounces short in measure, namely 124 ounces instead of the full 128 ounces. The remaining 4 ounces will be dispensed by the retailer from the device of the present invention, as shown in Fig. 19, and will then be added to and mixed with the 124 ounces of white paint in the container to make up a full gallon of paint of the desired color. Similarly quart containers of white paint will be shipped one ounce short, and pint containers will be ½ ounce short, the difference to be made up by the present dispensing device.

Since different shades and different colors do not all require the same volume of pigment, a fourth counter 170, which is similar in all respects to the counters 80, 81 and 82 described above, has been added. The counter 170 is not associated with any selector switch, but is connected by a conductor 171 to a point on selector switch 79 which selects white paint which is the same as the white paint constituting the 124 ounces in the one gallon containers.

In operating the arrangement of Fig. 19, the four counters are always set to a fixed, predetermined total count which will result, in the case of gallons, in the dispensing of exactly four ounces comprising a mixture of pigments and of white paint. Any difference between the total volume of the pigments and the required volume of four ounces is made up by adding this amount of white paint to the mixture of the pigments. As previously stated, these pigments are carried by a suitable liquid vehicle.

An additional relay 172 has been provided which is connected in a manner similar to relay 101 in Fig. 8 to terminate further operation of the dispensing device at the completion of the predetermined count on counter 170, and conductor 160 which extends to terminal 1 of counter 172 has been provided for this purpose, connecting this terminal to reset magnet 88 of starting button 87.

The operating winding 173 of relay 172 is energized upon completion of the count of the counter 82 via a conductor 174 from terminal 1 of counter 82. The operation of relay 172 transfers conductor 102 to conductor 171 which is connected to the particular one of the terminals 92 on selector switch 79 which selects white paint. The counter starting conductor 115 is simultaneously transferred to conductor 175 which extends to counter 170. At the completion of the preset count of counter 170, dispensing action is terminated by the energization of reset magnet 88 as described above for Fig. 8.

It will thus be seen that the dispensing device will dispense a mixture of pigments and white paint in the exact volume required, the relative proportions being determined by the individual settings of the counters. In the example given, this will be a total volume of four ounces, one ounce or a half ounce for respective final volumes of one gallon, a quart and a pint.

Fig. 20 shows a modification of Fig. 19 wherein the fourth counter 170 of Fig. 19 is replaced by weight actuated control means. The weight actuated means is responsive to the total weight of the container and its contents and becomes effective only after each of the three presettable counters 80, 81 and 82 has completed its individual count, as described above. In this embodiment the total amount of liquid dispensed may be equalized to a predetermined fixed value by providing a weight responsive switch 177 arranged to close a pair of contacts 178—179 when the weight of the container 103 reaches a fixed predetermined value.

In this case, conductor 171 additionally extends through the normally open contacts 178—179 of the weight responsive switch via conductor 160 which operates the reset magnet 88 of the starting button 87.

Conductor 175 extends to a self-locking relay 180, the self-locking relay 180 being provided with an independent pair of normally open contacts 181—182 in addition to the self-locking contacts 183—184. Relay 180 is shown provided with a winding 185 connected to conductor 175, the other side of winding 185 being grounded. Contact 181 is connected to "A. C." and the other contact 182 is connected to the valve actuating solenoid 127 by an extension of conductor 126. The self-locking relay 180 will not start the dispensing of paint by solenoid 127 until the selector wheel 46 has come to rest with the particular storage tank 20 which contains the liquid to be dispensed by weight is in the dispensing position with respect to container 103. Thereupon the next closure of start impulse contacts 108 controlled by cam 112 will lock in relay 180 and energize solenoid 127 starting the dispensing. Closure of the weight-actuated contacts 178—179 of switch 177 will release starting button 87 by energization of its magnet 88.

In this manner, the desired quantities of each pigment bearing liquid will be volumetrically dispensed, followed by the dispensing of a predetermined amount of a particular liquid, such as white paint, for example, in an amount sufficient to build the total weight of the container and its contents up to a predetermined fixed value. It is to be understood that the operative weight setting for the weight actuated switch 177 must be arranged in correspondence to the setting of the "Gallons," "Pints,"

"Quarts" switch 83 and the empty weight of the particular container.

We have shown what we believe to be the best embodiments of our invention. We do not wish, however, to be confined to the embodiments shown, but what we desire to secure by Letters Patent is the invention as defined in the appended claims.

We claim:

1. In a liquid dispensing device, in combination, a plurality of reservoirs for liquids, an individual positive displacement pump connected to each reservoir for dispensing liquid therefrom, drive means for each pump, said drive means comprising a power operated shaft common to all of said pumps, each of said pumps dispensing the same volume of liquid for a predetermined angular displacement of said shaft, and selectively operable control means individual to each reservoir and responsive to angular displacement of said power operated shaft for starting and stopping dispensing operation of its associated pump.

2. A device of the class described, comprising: a plurality of liquid storage tanks; controllable means for producing relative movement between said tanks and a container to be filled therefrom; a plurality of independently manually presettable selective means adapted to select a particular tank for stopping said movement when said container is positioned to receive liquid from the preselected one of said tanks; an individual control valve connected to each tank and disposed to control the dispensing of liquid therefrom; an individual positive displacement pump for each tank connected to cause liquid to flow from its associated tank into said container when the tank and container are in said preset selected position with respect to each other, said flow being controllable by said valve; counter actuating means operative during conditions of fluid flow into said container; a counter operatively associated with each of said presettable selective means, each counter being responsive to said actuating means only during fluid flow conditions from the tank selected by its associated presettable selective means, and each comprising means for controlling said valve to close the same after reaching a predetermined count; control means responsive to each said stopping of said movement and connected to initiate said flow, said control means comprising means for causing said controllable movement producing means to be responsive successively to each of said presettable selective means.

3. A device according to claim 2 in which each of said counters comprises individual manually operable presetting means for independently selecting in each counter the magnitude of said predetermined count.

4. A device for the class described, comprising: a plurality of liquid storage tanks; controllable means for producing relative movement between said tanks and a container to be filled therefrom; manually presettable selective means adapted to select a particular tank for stopping said movement when said container is positioned to receive liquid from the preselected one of said tanks; an individual control valve for each tank having an inlet and two outlets, said valve being connected to its associated tank and disposed to control the dispensing of liquid therefrom from one outlet thereof, the other outlet normally feeding liquid back into its associated tank; an individual continuously operating positive displacement pump for each tank connected to cause liquid either to flow from its associated tank into said container when the tank and container are in said preset selected position with respect to each other or to flow back into said tank, said flow being controllable by said valve; counter actuating means operative during conditions of dispensing fluid flow into said container; a counter responsive to said actuating means and comprising means for controlling said valve to stop dispensing therefrom after reaching a predetermined count; and control means responsive to said stopping of said movement and connected to initiate said dispensing flow.

5. A device according to claim 4 in which said counter comprises manually operable presetting means for selecting the magnitude of said predetermined count.

6. A device of the class described, comprising: a plurality of liquid storage tanks; controllable means for producing relative movement between said tanks and a container to be filled therefrom; a plurality of independently manually presettable selective means adapted to select a particular tank for stopping said movement when said container is positioned to receive liquid from the preselected one of said tanks; an individual control valve for each tank having an inlet and two outlets, said valve being connected to its associated tank and disposed to control the dispening of liquid therefrom from one outlet thereof, the other outlet normally feeding liquid back into its associated tank; an individual continuously operating positive displacement pump for each tank connected to cause liquid either to flow from its associated tank into said container when the tank and container are in said preset selected position with respect to each other or to flow back into said tank, said flow being controllable by said valve; counter actuating means operative during conditions of dispensing fluid flow into said container; a counter operatively associated with each of said presettable selective means, each counter being responsive to said actuating means only during dispensing fluid flow conditions from the tank selected by its associated presettable selective means, and each comprising means for controlling said valve to stop dispensing therefrom after reaching a predetermined count; control means responsive to each stopping of said movement and connected to initiate said dispensing flow, said control means comprising means for causing said controllable movement producing means to be responsive successively to each of said presettable selective means.

7. A device according to claim 6 in which each of said counters comprises individual manually operable presetting means for independently selecting in each counter the magnitude of said predetermined count.

8. A device of the class described, comprising: a plurality of liquid storage tanks disposed adjacent to each other in a generally circular arrangement; revoluble supporting means for said tanks comprising a hollow shaft; a first controllable driving means disposed to rotate said hollow shaft; a pump connected to each tank, each pump comprising an individual driving gear; a main gear meshing with all of said individual gears; a shaft passing through said hollow shaft and connected to drive said main gear; and a second controllable driving means disposed to rotate said last named shaft, whereby the position of said tanks and the action of said pumps may be independently controlled, and with said last named shaft stationary, said pumps will be operated during rotation of said hollow shaft.

9. A device according to claim 8, further comprising manually presettable selective means disposed to stop operation of said first driving means when a particular tank is in a predetermined fixed position.

10. A device according to claim 9, wherein said selective means comprises: a selector switch having a separate position for each tank and disposed to establish a separate electrical circuit in each such position; a plurality of circuit controlling means, each included in one of said electrical circuits and each successively actuated by said supporting means in a predetermined position thereof with respect to one of said tanks; and control means for stopping operation of said driving means connected to all of said circuit controlling means and responsive to actuation of any one thereof.

11. A device according to claim 10, wherein said actuating device is a solenoid.

12. A device according to claim 9, further comprising a mechanically actuable valve connected to each tank for dispensing liquid therefrom; and a fixedly positioned actuating device disposed to actuate the valve of the particular tank which is in said predetermined fixed position.

13. A device according to claim 4, wherein said liquid fed back in said tank is delivered therein at a point near the top of the tank.

14. A device according to claim 4, wherein said liquid fed back into said tank is delivered therein through means disposed below the normal level of liquid stored in said tank, said delivery means producing a jet for agitating the stored liquid.

15. A device according to claim 14, wherein the delivery means has a plurality of outlets therein producing a plurality of jets.

16. A device of the class described, comprising a plurality of liquid storage tanks; controllable means for producing relative movement between the tanks and a container to be filled therefrom; manually presettable selective means for stopping said movement when said container is positioned to receive liquid from the preselected one of said tanks; a positive displacement pump comprising counter actuating means controllably connected to dispense liquid from said pre-selected tank into said container; a counter responsive to said actuating means during the dispensing of said liquid, weight responsive means disposed for actuation by the total weight of said container and its contents, control means responsive to said counter upon reaching a predetermined count and connected to render said weight responsive means effective to terminate said dispensing, said weight responsive means being actuable by said container upon reaching a predetermined maximum weight to terminate the further dispensing of said liquid.

17. A device according to claim 4, further comprising additional selective means effective after said counter has reached said predetermined count and adapted to select another one of said tanks for stopping said movement when said container is positioned to receive liquid from said last-named tank, and weight responsive means actuated by said container upon reaching a predetermined weight and comprising means for controlling said valve to close the same when said predetermined weight has been reached.

18. A device as in claim 4 further comprising a return flow duct connected to said other outlet of said valve and having a discharge outlet therein disposed above the highest liquid level in each tank, and liquid flowing means interposed between said discharge outlet and said tank liquid for smoothly flowing said returning liquid into said liquid in said tank in an even manner, whereby entraining of air and turbulence in said tank liquid by the returning liquid is avoided.

19. A device of the class described, comprising: a plurality of liquid storage tanks; controllable means for producing relative movement between said tanks and a container to be filled therefrom; manually presettable selective means adapted to select a particular tank for stopping said movement when said container is positioned to receive liquid from the preselected one of said tanks; an individual control valve for each tank and having an inlet and two outlets, said valve being connected to its associated tank and disposed to control the dispensing of liquid therefrom from one outlet thereof, the other outlet normally feeding liquid back into its associated tank; an individual positive displacement pump for each tank connected to cause liquid either to flow from its associated tank into said container when the tank and container are in said preset selected position with respect to each other or to flow back into said tank, said flow being controllable by said valve; and terminating means responsive to operation of said pump and disposed to operate on said valve to terminate flow of liquid from said valve to said container after a predetermined amount of pumping operation has occurred.

20. A device of the class described, comprising: a plurality of liquid storage tanks; an individual control valve for each tank and having an inlet and two outlets, said valve being connected to its associated tank and disposed to control the dispensing of liquid therefrom from one outlet thereof to a container, the other outlet normally feeding liquid back to its associated tank; an individual positive displacement pump for each tank connected to said valve to cause said liquid flow therethrough; common support means for all of said tanks, first drive means for said support means to thereby rotate said tanks; driving gear means operatively engaging all of said pumps, whereby rotation of said tanks by said support means causes said pumps to circulate liquid in each of said tanks through said valves; means for stopping rotation of said support means upon positioning of a particular one of said tanks to dispense liquid to said container; second drive means for rotating said driving gear means to thereby actuate said pumps for circulation of liquid in said tanks upon said positioning of said one tank; and terminating means responsive to dispensing of liquid from said one tank and disposed to operate on the valve of said one tank to terminate flow to said container after dispensing of a predetermined amount of liquid.

21. A device according to claim 20, said first drive means including a hollow shaft, said second drive means including a further shaft extending through said hollow shaft.

22. A device of the class described, comprising: a plurality of liquid storage tanks disposed adjacent to each other in a generally circular arrangement; revoluble supporting means for said tanks; controllable driving means for rotating said supporting means; a presettable selector switch having a separate position for each tank and connected to establish a separate electrical circuit in each such position; a plurality of circuit controlling means, each individually included in one of said electrical circuits and each successively actuated by said supporting means in a predetermined rotational position thereof with respect to one of said tanks; control means for stopping operation of said driving means when a particular tank selected by said selector switch is in a predetermined fixed position, said control means being connected to all of said circuit controlling means and responsive to actuation of a particular one thereof selected by said selector switch; an individual mechanically actuable valve connected to each tank for dispensing liquid therefrom, each valve being supported by said supporting means for movement with its associated tank; each of said valves comprising an actuating member disposed at the circumference of a circle concentric with the rotational axis of said supporting means; and a fixedly positioned actuating device disposed at said circumference, said actuating device being adapted to operate the actuating member of the valve associated with the particular tank which is in said predetermined fixed position when operation of said driving means is stopped by said control means.

23. A device according to claim 22, wherein said actuating device is a solenoid.

24. A liquid dispensing device of the class described, comprising: a plurality of liquid storage tanks; controllable means for producing relative movement between said tanks and a container to be filled therefrom; selective means for stopping said movement when said container is positioned to receive liquid from a particular one of said tanks determined by said selective means; a positive displacement pump connected to dispense liquid from said particular tank into said container; means including a power operated shaft for driving said pump; and terminating means actuated in accordance with a predetermined maximum amount of angular displacement of said shaft and disposed to terminate dispensing operation of said pump after a predetermined amount of dispensing operation accompanying said angular displacement has occurred.

25. A device according to claim 24, in which said terminating means comprises presettable means for adjusting the magnitude of said maximum angular displacement.

26. A liquid dispensing device of the class described, comprising: a plurality of liquid storage tanks; controllable means for producing relative movement between said tanks and a container to be filled therefrom; selective means for stopping said movement when said container is positioned to receive liquid from a particular one of said tanks determined by said selective means; a positive displacement pump connected to dispense liquid from said particular tank into said container; means including a power operated shaft for driving said pump; weight responsive means responsive to the total weight of said container and the liquid dispensed therein; a first terminating means actuated in accordance with a predetermined maximum amount of angular displacement of said shaft and disposed to terminate dispensing operation of said pump after a predetermined amount of dispensing operation of said pump has occurred, said dispensing operation being insufficient for operation of said weight responsive means; means responsive to operation of said first terminating means and connected to said controllable means and to said selective means for producing further relative movement between said tanks and said container and stopping said movement when said container is positioned to receive liquid from a tank different from the tank with respect to which dispensing operation was terminated by said first terminating means; a pump connected to dispense liquid from said different tank into said container; and a second terminating means controlled by said weight responsive means for terminating dispensing operation of said last-named pump.

References Cited in the file of this patent

UNITED STATES PATENTS

| Re. 22,391 | Mathey | Nov. 9, 1943 |
| 1,512,964 | Willis | Oct. 28, 1924 |
| 1,898,619 | Dare | Feb. 21, 1933 |
| 1,961,882 | Laganas | June 5, 1934 |
| 2,043,668 | Kohler | June 9, 1936 |
| 2,126,238 | Whitson | Aug. 9, 1938 |
| 2,158,774 | Grubelic | May 16, 1939 |
| 2,212,343 | Goehring | Aug. 20, 1940 |
| 2,249,180 | Scully et al. | July 15, 1941 |
| 2,326,359 | Humbert | Aug. 10, 1943 |
| 2,348,149 | Reinhardt et al. | May 2, 1944 |
| 2,460,605 | Soissa | Feb. 1, 1949 |
| 2,593,607 | Pruett | Apr. 22, 1952 |
| 2,606,690 | Hansen | Aug. 12, 1952 |
| 2,659,619 | Saxe | Nov. 17, 1953 |
| 2,660,351 | Thompson | Nov. 24, 1953 |